United States Patent [19]
Kuranami

[11] Patent Number: 5,364,164
[45] Date of Patent: Nov. 15, 1994

[54] HEADREST FOR SEATS

[75] Inventor: Shunji Kuranami, Kanagawa, Japan

[73] Assignee: Koito Industries, Ltd., Kanagawa, Japan

[21] Appl. No.: 920,435

[22] PCT Filed: Nov. 11, 1991

[86] PCT No.: PCT/JP91/01541
§ 371 Date: Aug. 25, 1992
§ 102(e) Date: Aug. 25, 1992

[87] PCT Pub. No.: WO92/10963
PCT Pub. Date: Jul. 9, 1992

[30] Foreign Application Priority Data

Dec. 25, 1990 [JP] Japan ................... 2-412896

[51] Int. Cl.⁵ ........................................ A47C 7/36
[52] U.S. Cl. .............................. 297/408; 297/391; 16/334
[58] Field of Search ............... 297/391, 408, 220; 403/93, 95, 96; 16/324, 334

[56] References Cited

U.S. PATENT DOCUMENTS

| | | | |
|---|---|---|---|
| 2,869,622 | 1/1959 | Petersen et al. | 297/408 |
| 3,484,831 | 12/1969 | Higuchi | 297/356 |
| 4,370,898 | 2/1983 | Maruyama | 403/93 |
| 4,674,797 | 6/1987 | Tateyama | 297/408 |
| 5,145,233 | 9/1992 | Nagashima | 297/408 |

FOREIGN PATENT DOCUMENTS

| | | | |
|---|---|---|---|
| 0240996 | 6/1960 | Australia | 16/334 |
| 3131597 | 2/1983 | Germany | 297/408 |
| 0186746 | 10/1984 | Japan | 297/408 |
| 64-35949 | 3/1989 | Japan . | |
| 4999912 | 7/1965 | United Kingdom | 16/334 |

Primary Examiner—Peter M. Cuomo
Assistant Examiner—Darnell M. Boucher
Attorney, Agent, or Firm—Edwin E. Greigg; Ronald E. Greigg

[57] ABSTRACT

A headrest for seats which is recessed in a central recess of the seat and is capable of tilting forward so as to be used as a headrest, and automatically returning this headrest to its original position by tilting it forward more than a predetermined angle with respect to the seat back. The headrest is formed on an upper portion of a seat back and is swingably supported by means of a hinge mechanism equipped with a ratchet mechanism. The hinge mechanism 8 includes a movable hinge portion fixed on a lower portion of a supporting frame of the headrest, and a hinge main body fixed on a seat back frame so as to be hingedly supported on a rotational shaft together with the movable hinge portion. Further, there is provided a return spring together with the supporting frame of the headrest that returns the headrest to its recessed position. Moreover, the ratchet mechanism is constituted in such a manner than, when the headrest is tilted forward beyond a predetermined angle, the ratchet gear is disengaged from the ratchet claw member so that the headrest can be returned to its original position by the pulling force of the return spring.

3 Claims, 5 Drawing Sheets

HEADREST FOR SEATS

DESCRIPTION

Headrest for Seats

TECHNICAL FIELD

The present invention relates to a headrest used in various seats for airplanes, ships, rail road vehicles and so on, which is capable of tilting forward its supporting surface for supporting a rear head region of a person seated on a seat within a predetermined angle range.

BACKGROUND ART

Conventionally, there has been known a seat used for airplanes, ships, rail road vehicles and so on which consists of a seat back 51 having a top portion equipped with a headrest 52 hingedly supported on a hinge point 53 so as to be tiltable forward with respect to the seat back 51.

However, in the above conventional case, all of the headrest 52 is constituted to be tiltable forward with respect to the seat back 51 by being tilted about the hinge point 53. Therefore, in the case where some passengers walk an aisle in an airplane by holding the headrests 52 which are tilted forward, there is a problem such that the headrests 52 moves unintentionally and causes a passenger seated on the seat trouble.

Furthermore, when a passenger room of an airplane is cleaned up or a passenger car of a train is cleaned up at a terminal station, if numerous headrests of seats are tilted forward, it requires a large manpower to return these headrests to their original positions, and also it would be a time-consuming work.

The present invention has been done in view of the above problems and disadvantages encountered in the prior art, and has an object to provide a headrest for seats in which only an upper central portion of a seat back is capable of tilting forward so as to be used as a headrest, and capable of automatically returning this headrest to its original position by tilting it forward more than a predetermined angle with respect to the seat back.

DISCLOSURE OF INVENTION

In accordance with the present invention there is provided a headrest for seats which is retractably installed with respect to a recessed portion formed on an upper portion of a seat back and is swingably supported by means of a hinge mechanism equipped with a ratchet mechanism. And, said hinge mechanism includes a movable hinge portion fixed on a lower portion of a supporting frame of a headrest, and a hinge main body fixed on a seat back frame so as to be hingedly supported on a rotational shaft together with the movable hinge portion. And further, there is provided a return spring together with the supporting frame of the headrest to return the headrest to its raised position. Moreover, said ratchet mechanism is constituted in such a manner that, when the headrest is tilted forward beyond a predetermined angle, its ratchet gear is disengaged from its ratchet claw member so that the headrest can be returned to its original position by the pulling force of the return spring.

With the above arrangement, it becomes possible to adjust an angle of the headrest stepwisely when the seat back is tilted forward. Therefore, since the headrest supports a rear head region of a person seated on a seat perfectly, it becomes possible to prevent a neck region and an abdominal region from being tired so much. Especially, the headrest is constituted so as to tilt forward and rearward in the recessed portion formed on the upper portion of the seat corresponding to a rear head region of a passenger through the hinge mechanism. Therefore, even if a passenger walking an aisle in an airplane holds an upper portion of a seat unexpectedly, his or her hand is prevented from directly touching the headrest. Therefore, the headrest is not unexpectedly moved and, thus, it is surely avoided to cause the person seated on the seat trouble.

Moreover, if the tilted headrest is further tilted down to the lowest end, it can be easily and accurately returned to the original position by the pulling force of the return spring equipped in the hinge mechanism. Therefore, it becomes possible to promptly and easily clean up a passenger room of an airplane or a passenger car of a train at a terminal station.

BEST MODE FOR CARRYING OUT THE INVENTION

Now referring to the accompany drawings, an embodiment of the headrest for seats in accordance with the present invention is explained.

Figure 1:
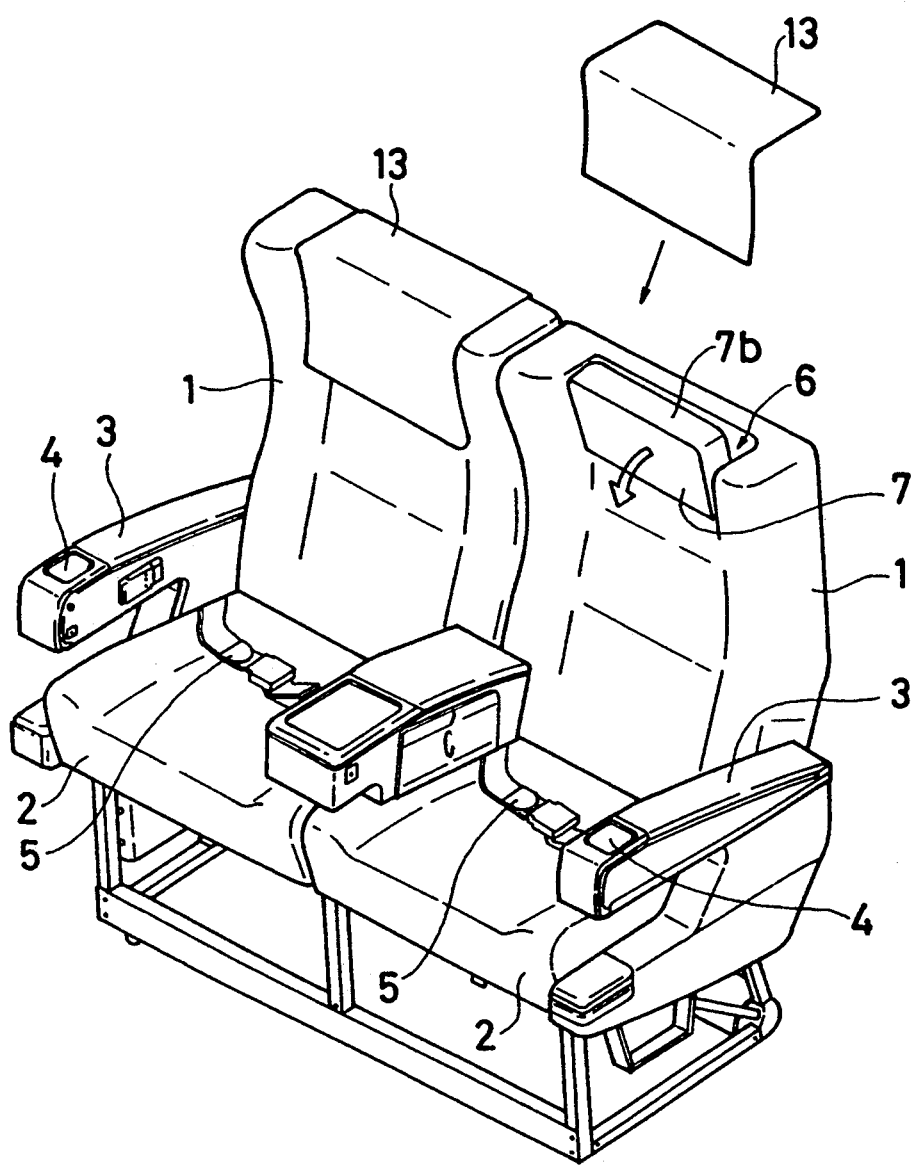
FIG. 1 is a perspective view of a seat showing an embodiment of a headrest for seats.

FIG. 1 shows a seat for an airplane including a headrest in accordance with the present invention.

In the drawing, a reference numeral 1 denotes a seat back which is hingedly supported on a rear end of the seat bottom 2 through a reclining mechanism (not shown) having a hinge point on the rear end of the seat bottom, so as to be reclined rearward. There are fixedly provided a pair of armrests 3, 3 at opposite sides of the seat bottom 2. And, ashtray 4 etc. are provided at a front end of the armrest 3. Further, a seat belt 5 is equipped between these armrests 3, 3.

Figure 2:
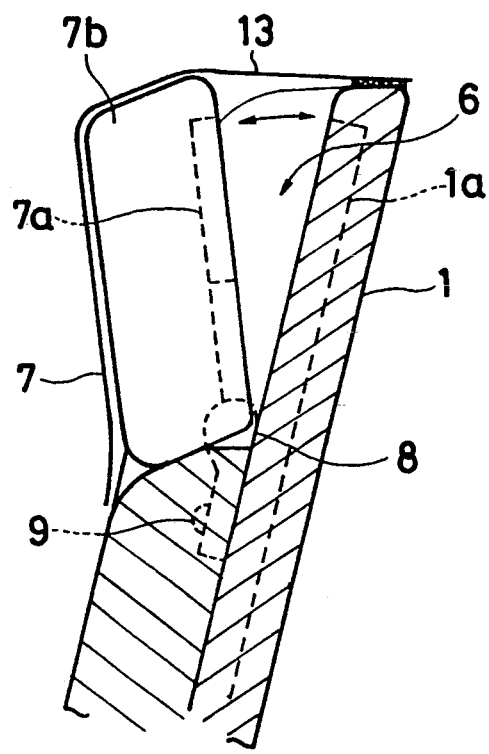
FIG. 2 is a cross-sectional side view showing a seat back under the condition where its headrest portion is tilted forward.
Figure 3:
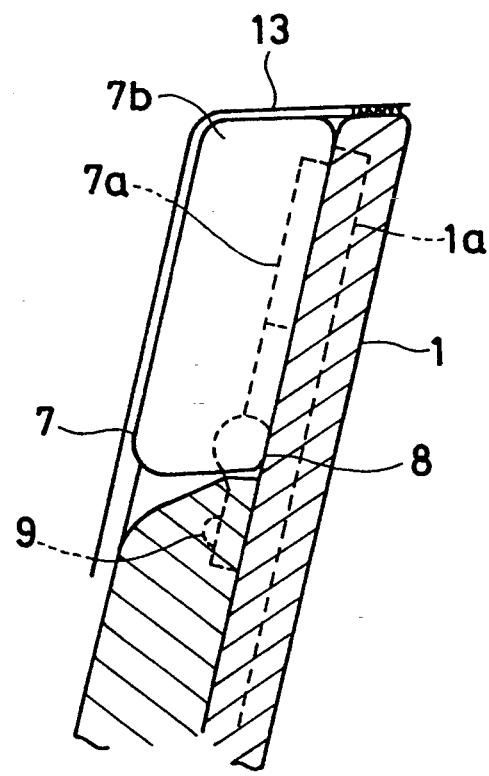
FIG. 3 is a cross-sectional side view showing a seat back under the condition where its headrest portion is retracted in its original portion.

FIGS. 2 and 3 show a headrest in accordance with the present invention. There is provided a recessed portion 6 of substantially rectangular shape on an upper portion of the seat back 1, at a location corresponding to a rear head region of a passenger seated on the seat. A headrest 7 has substantially the rectangular shape so as to be retracted in the recessed portion 6, and has a supporting frame 7a therein. A lower portion of the supporting frame 7a is fixed on a frame 1a of the seat back 1 through a hinge mechanism 8 by means of a screw etc.

A reference numeral 13 denotes a headrest cover which covers the upper portion of the seat back 1. This headrest cover 13 serves to conceal a gap occurring between the seat back 1 and the headrest 7 when the headrest 7 is tilted forward. Therefore, not only can extraneous substances be prevented from entering into the gap but an appearance of the headrest 7 can be nicely maintained.

FIGS. 4 through 7 show a hinge mechanism and a ratchet mechanism.

This hinge mechanism 8 consists of a fixed hinge main body 10 and a movable hinge portion 11. The movable hinge portion 11 is supported on the hinge main body 10 through a rotational shaft 12 so as to be swingable about the rotational shaft 12. The hinge main body 10 of the hinge mechanism 8 is fixed on the frame la of the seat back 1 by means of a screw 9 and so on. And, the movable hinge portion 11 is fixed on the supporting frame 7a of the headrest 7 by means of a screw 9 and so on. Furthermore, the rotational shaft 12 serves as a hinge point P, and is installed on the seat back 1 such that its height becomes substantially equal to a height of a neck region of a seated person.

Figure 6:
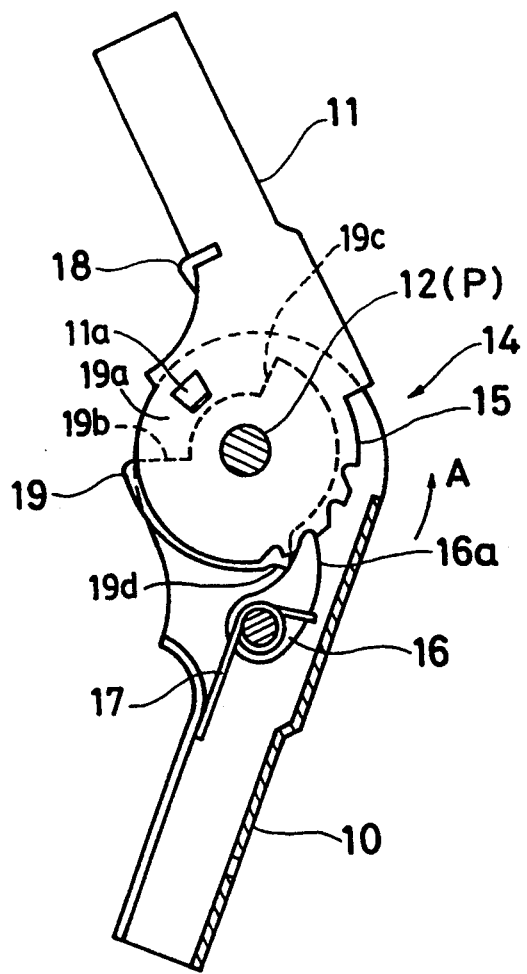
FIG. 6 is a side view partly broken away to show a ratchet mechanism.
Figure 7:
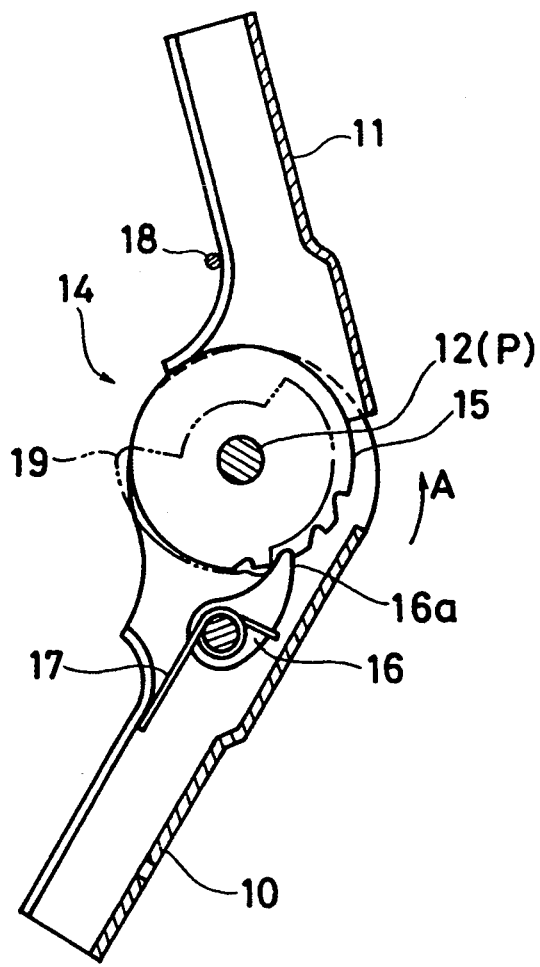
FIG. 7 is a side view partly broken away to show the ratchet mechanism.
Figure 8:
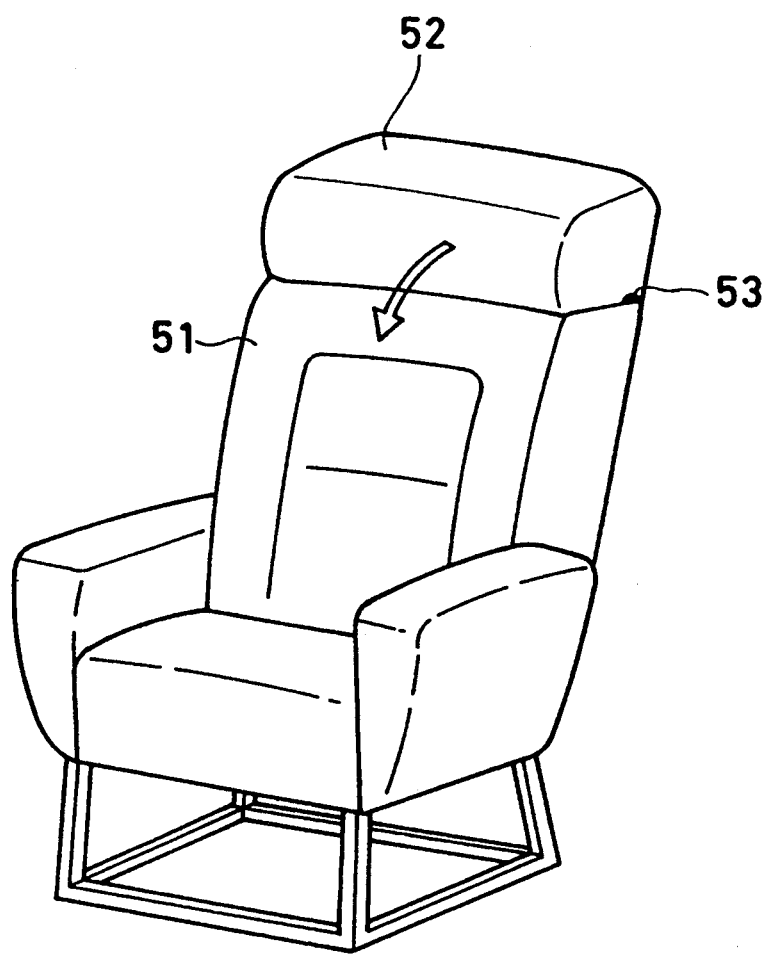
FIG. 8 is a perspective view showing a seat equipped with a conventional headrest.

At a shaft portion 12 of the hinge mechanism 8, there is provided a ratchet mechanism 14 for easing the headrest tilting forward as shown in FIGS. 6 and 7. This ratchet mechanism 14 includes a ratchet gear 15 formed on the movable hinge portion 15 and a ratchet claw member 16 or pawl meshing with this ratchet gear 15. A base end of the ratchet claw member 16 is hingedly supported on the hinge main body 10. And, a distal end 16a of the ratchet claw member 16 is urged to engage with the ratchet gear 15 by a spring 17 provided on the hinge main body 10.

A gear portion of the ratchet gear 15 is formed in such a configuration that it allows the ratchet gear 15 to rotate in only one direction (i.e. a direction of an arrow A), so that the headrest 7 can rotate synchronously in only one direction of the arrow A. Therefore, even if the headrest 7 is applied a force acting in an opposite direction of the arrow A, the ratchet gear 15 firmly meshes with the ratchet claw member 16 so as to resist such a reverse rotation.

Figure 4:
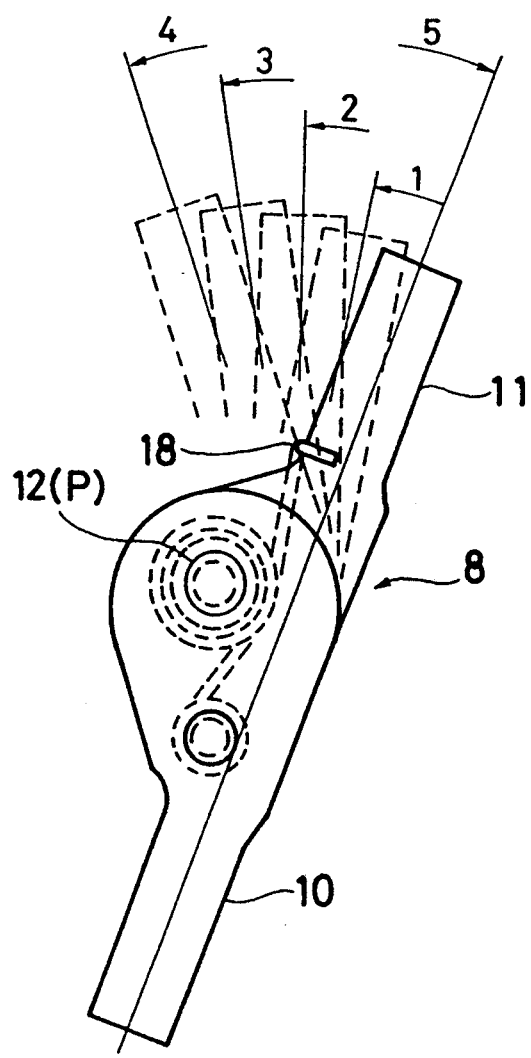
FIG. 4 is a side view showing a hinge mechanism.
Figure 5:
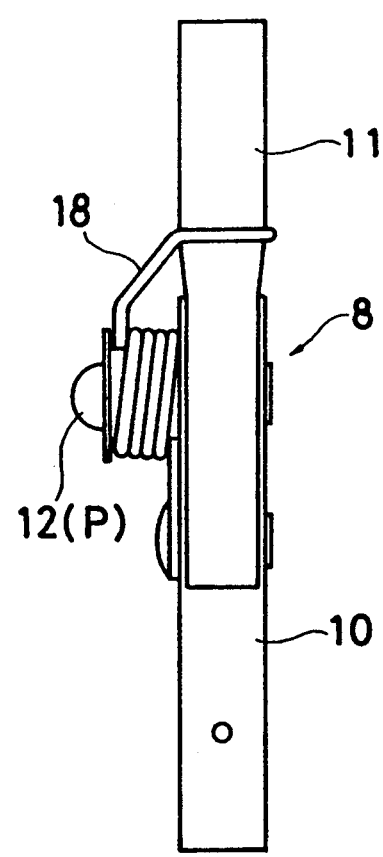
FIG. 5 is a front view showing the hinge mechanism.

Accordingly, if the headrest 7 is applied a force acting in its rotational direction (i.e. the direction of the arrow A), it becomes possible to change the inclined angle of the headrest as much as desired so as to fit to a head region of a person seated on the seat. Thus, it brings comfort to a seated person. That is, the headrest 7 can be used preferably. In this embodiment, the ratchet gear 15 has four teeth so that the headrest 7 can be adjusted at four different tilt angles, as shown in FIG. 4.

Especially, in accordance with the present invention, the ratchet mechanism 14 is constituted in such a manner that not only the ratchet claw member 16 or pawl meshes with the ratchet gear 15 so that the movable hinge portion 11 is allowed to swing in only one direction with respect to the hinge main body 10 but a cam plate 19 releases the engagement between the ratchet claw member 16 and the ratchet gear 15. The cam plate 19 is formed with a section 19a missing to form faces 19b and 19c and the movable hinge portion 11 is provided with a protusion 11a which protrudes into the section 19a. As the movable hinge portion 11 moves beyond the last notch of the ratchet gear, the protrusion 11a in contact with the face 19b of the cam plate 19 rotates the cam plate so that protrusion 19d contacts the panel 16 to release the engagement of the ratchet claw 16a from the ratchet 15. Therefore, if the headrest 7 tilts forward beyond a predetermined angle, the ratchet gear 15 is disengaged from the ratchet claw member 16 and the headrest 7 is returned to its original position (i.e. a raised position) by means of a pulling force of a return spring 18. As the movable hinge portion moves to its normal rest position, the protrusion 11a contacts the cam plate face 19c to rotate the cam plate such that the pawl 16a is released and is now ready to interfit into the notches of the ratchet gear 15. Thus, the pawl is operated by the cam plate to disengage the pawl and the cam plate is rotated by the hinge portion 11 via the protrusion 11a.

Moreover, it is needless to say that the same effect can be obtained even if the hinge main body 10 is fixed on the supporting frame 7a of the headrest 7 and the movable hinge portion 11 is fixed on the seat back frame la.

Next, a method for using the headrest for seats in accordance with the present invention will be explained.

A seated person can tilt the headrest 7 at a desired angle by slightly pushing the upper portion 7b of the headrest 7 forward so that the headrest 7 can tilt forward about the rotational shaft 12 of the hinge mechanism 11 as a hinge point P fixed on the supporting frame 7a of the headrest 7. Then, if the headrest 7 is further slightly tilted forward, the ratchet claw member 16 of the ratchet mechanism 14 meshes with the ratchet gear 15. Thus, the headrest 7 can be adjusted at several different angles corresponding to the number of the teeth of the ratchet gear 15 to hold a forward tilting at a determined angle.

To the contrary, if the headrest 7 is tilted down to the lowest end, the ratchet claw member 16 of the ratchet mechanism 14 is disengaged from the ratchet gear 15, and the headrest 7 is returned to its original position (the raised position) by the pulling force of the return spring 18.

INDUSTRIAL APPLICABILITY

As is explained in the foregoing description, the headrest for seats in accordance with the present invention is useful for the headrest for various seats used in airplanes, ships, rail road vehicles and so on. Especially, it is suitable for seats that are required to be capable of easily and promptly returning their headrests from their tilted positions to their original positions, for example, in the case where a passenger room of an airplane is cleaned up or a passenger car of a train is cleaned up at a terminal station.

What is claimed is:

1. A headrest for a seat including a main frame, a seat back (1), a seat bottom (2), and arm rests (3), all supported on said main frame, said seat back includes an upper recessed portion (6) positioned in said seat back at a location corresponding to a rear head region of a person seated on said seat bottom, said headrest includes a supporting frame which is swingably supported on said main frame by a hinge mechanism equipped with a ratchet mechanism and said headrest is in an original position when the headrest is at a back-most position within said upper recessed portion (6), said hinge mechanism includes a movable hinge portion (11) which is secured to said headrest supporting frame, a hinge main body (10) which is fixedly secured to said main frame, a rotational shaft (12) about which said movable hinge portion is movable, and a return spring (18) mounted around said rotational shaft which biases said headrest toward said recessed portion of said seat back;

said ratchet mechanism includes a ratchet gear and a ratchet claw member and is constituted in such a manner that when the headrest is tilted forward beyond a predetermined angle, said ratchet gear is disengaged from said ratchet claw member by a cam plate (19) so that the headrest can be returned to the original position by a pulling force of said return spring.

2. A headrest as set forth in claim 1 in which said ratchet gear and said ratchet claw member or pawl, which corresponds with said ratchet gear, positions said headrest in different positions.

3. A headrest as set forth in claim 2, which includes a cam plate (19) which releases said ratchet claw from said ratchet gear and said spring (18) automatically moves the headrest to its recessed position.

* * * * *

UNITED STATES PATENT AND TRADEMARK OFFICE
CERTIFICATE OF CORRECTION

PATENT NO. : 5,364,164  
DATED : November 15, 1994  
INVENTOR(S) : Johannes PLATZEK et al.

Page 1 of 3

It is certified that error appears in the above-indentified patent and that said Letters Patent is hereby corrected as shown below:

Claim 1; column 49, line 1: Delete "give" and insert -- five --.

Claim 1; column 50, line 10: Delete " ---- " and insert -- --- --.

Claim 1; column 50, line 11: After "with" delete "r".

Claim 1; column 51, line 14: Delete "$COCH_2Br$;" (Second occurance).

Claim 1; column 51, line 51: After "chelate" insert -- ,K,-- --.

Claim 8; column 54, line 19: After "," insert -- wherein $R^+$ and $R^y$ stand for natural amino acid residues;

$-CH_2-CH(OH)-CH_2-O-(CH_2)_2-NHCS-$;

$-CH_2-CH(OH)-CH_2-NHCS-$;

$-CH_2-CH(OH)-CH_2-O-(CH_2)_2-O-(CH_2)_2NHCS-$;

$-CH_2-CH(OH)-CH_2-O-(CH_2)_2-NH-CO-CH_2-$;

$-CH_2-CH(OH)-CH_2-O-C_6H_4-NHCS-$;

UNITED STATES PATENT AND TRADEMARK OFFICE
CERTIFICATE OF CORRECTION

Page 2 of 3

PATENT NO. : 5,364,164
DATED : November 15, 1994
INVENTOR(S) : Johannes PLATZEK et al.

It is certified that error appears in the above-indentified patent and that said Letters Patent is hereby corrected as shown below:

$-CH_2-CH(OH)-CH_2-O-C_6H_4-NHCO-;$ $-CH_2-CH(OH)-CH_2-O-CH_2-C_6H_4-NHCS-;$ $-CH_2-O-C_6H_4-CH_2-;$  $-CH_2-CH(OH)-CH_2-O-C_6H_4-CH_2-;$ $-C(=NH)-O-C_6H_4-CH_2-;$ $-(CH_2)_4-NH-CO-CH_2-O-C_6H_4-CH_2-;$  $-(CH_2)_4-NH-CH_2-CH(OH)-CH_2$
$-O-C_6H_4-CH_2-;$  $-(CH_2)_3-O-C_6H_4-CH_2-;$ $-CH_2-CO-NH-(CH_2)_3-O-CH_2-;$ $-CH_2-CO-NH-NH-;$  $-CH_2-CONH-(CH_2)_2-;$  $-CH_2-CO-NH-(CH_2)_{10}-;$ $-CH_2-CONH-(CH_2)_2-S-;$

UNITED STATES PATENT AND TRADEMARK OFFICE
CERTIFICATE OF CORRECTION

PATENT NO. : 5,364,164
DATED : November 15, 1994
INVENTOR(S) : Johannes Platzek, et. al.

It is certified that error appears in the above-indentified patent and that said Letters Patent is hereby corrected as shown below:

$-(CH_2)_4-NH-CO-(CH_2)_8-$;  $-CH_2-CO-NH-(CH_2)_3-NH-$;

or $-(CH_2)_3-NH-$.

Signed and Sealed this

Twenty-eight Day of March, 1995

Attest:

BRUCE LEHMAN

Attesting Officer       Commissioner of Patents and Trademarks